US010679375B2

(12) United States Patent
Miles et al.

(10) Patent No.: US 10,679,375 B2
(45) Date of Patent: Jun. 9, 2020

(54) MARKERLESS TRACKING OF AN OBJECT

(71) Applicant: GUIDANCE MARINE LIMITED, Leicester (GB)

(72) Inventors: Russell William James Miles, Leicester (GB); Andrew James Knight, Leicester (GB)

(73) Assignee: GUIDANCE MARINE LIMITED, Leicester (GB)

( * ) Notice: Subject to any disclaimer, the term of this patent is extended or adjusted under 35 U.S.C. 154(b) by 0 days.

(21) Appl. No.: 15/386,757

(22) Filed: Dec. 21, 2016

(65) Prior Publication Data
US 2017/0186185 A1    Jun. 29, 2017

(30) Foreign Application Priority Data
Dec. 23, 2015    (GB) .................... 1522853.9

(51) Int. Cl.
*G06T 7/70*    (2017.01)
*G06T 7/11*    (2017.01)
(Continued)

(52) U.S. Cl.
CPC ............... *G06T 7/70* (2017.01); *G01S 13/66* (2013.01); *G01S 13/89* (2013.01); *G01S 13/937* (2020.01);
(Continued)

(58) Field of Classification Search
None
See application file for complete search history.

(56) References Cited

U.S. PATENT DOCUMENTS

| 5,973,309 A * | 10/1999 | Livingston | G01S 17/46 250/203.1 |
| 6,343,766 B1 * | 2/2002 | Livingston | F41H 13/005 244/3.11 |

(Continued)

FOREIGN PATENT DOCUMENTS

| EP | 2728376 A1 | 5/2014 |
| GB | 2246261 A | 1/1992 |
| GB | 2521259 A | 6/2015 |

OTHER PUBLICATIONS

Blais, Francois, Marc Rioux, and Steve G. MacLean. "Intelligent variable-resolution laser scanner for the space vision system." Acquisition, Tracking, and Pointing V. vol. 1482. International Society for Optics and Photonics, 1991. (Year: 1991).*

(Continued)

*Primary Examiner* — Vu Le
*Assistant Examiner* — Tracy Mangialaschi
(74) *Attorney, Agent, or Firm* — Patterson & Sheridan, LLP

(57) ABSTRACT

A markerless tracking device comprising a source configured to direct a beam on a plurality of beam paths, where each beam path illuminates a distinct region of an object; a sensor configured to receive beam reflected from each region in order to generate an image of each region; and a processor configured to generate a metric which indicates suitability of a beam trajectory, wherein the metric is generated by comparing images of selected regions, and wherein the beam trajectory is a path over which the beam is to be directed by the source during markerless tracking of the object.

19 Claims, 12 Drawing Sheets

(51) Int. Cl.
- *G06K 9/62* (2006.01)
- *G01S 15/93* (2020.01)
- *G01S 17/93* (2020.01)
- *G01S 15/89* (2006.01)
- *G01S 17/89* (2020.01)
- *G01S 17/42* (2006.01)
- *G01S 15/42* (2006.01)
- *G01S 17/66* (2006.01)
- *G01S 13/89* (2006.01)
- *G01S 13/66* (2006.01)
- *G01S 15/66* (2006.01)
- *G01S 13/937* (2020.01)
- *G01S 17/10* (2020.01)

(52) U.S. Cl.
CPC .............. *G01S 15/42* (2013.01); *G01S 15/66* (2013.01); *G01S 15/89* (2013.01); *G01S 15/93* (2013.01); *G01S 17/42* (2013.01); *G01S 17/66* (2013.01); *G01S 17/89* (2013.01); *G01S 17/93* (2013.01); *G06K 9/6202* (2013.01); *G06K 9/6215* (2013.01); *G06T 7/11* (2017.01); *G01S 17/10* (2013.01); *G06T 2207/30241* (2013.01)

(56) References Cited

U.S. PATENT DOCUMENTS

| | | | |
|---|---|---|---|
| 9,043,069 B1* | 5/2015 | Ferguson | B60W 30/00 701/23 |
| 2002/0126024 A1* | 9/2002 | Kaplan | G01S 17/10 340/984 |
| 2015/0102956 A1 | 4/2015 | Miles | |
| 2016/0041266 A1* | 2/2016 | Smits | G01S 7/4863 356/5.01 |

OTHER PUBLICATIONS

United Kingdom Search Report dated May 28, 2016 for Application No. GB1522853.9.

European Search Report, Application No. 16206747.4 dated May 22, 2017, 6 pages.

* cited by examiner

MARKERLESS TRACKING OF AN OBJECT

CROSS-REFERENCE TO RELATED APPLICATIONS

This application claims benefit of United Kingdom patent application number GB1522853.9, filed Dec. 23, 2015, which is herein incorporated by reference.

BACKGROUND

Field

Tracking devices measure changes in the position and orientation of an object relative to the tracking device caused by relative movement between the object and the tracking device as a result of the object and/or the tracking device moving. For example, the tracking device could be fixed to a vessel (such as a ship or submarine) which can move (either deliberately under its own power, or in response to the sea state). The object may be stationary relative to the earth (for example, a quayside in a port, or the sea bed), or the object may move (for example, the object may be another vessel which can move under its own power or in response to the sea state).

The measured changes in position and orientation of the object relative to the tracking device can be used to control the relative position and orientation between the object and the tracking device. For example, a tracking device may be fixed to a platform supply vessel which is to be maintained at a desired position and orientation relative to an object, such as an oil rig. The platform supply vessel may be moving in response to the sea state, as may the oil rig if it is floating. The tracking device measures the relative position and orientation between the platform supply vessel and the oil rig, and these measurements are used as a feedback to a dynamic positioning system on the platform supply vessel to control the position and orientation of the platform supply vessel with respect to the oil rig to maintain the desired relative position and orientation.

Some tracking devices require a marker, such as a reflector, to be pre-placed at a known position on the object to act as a reference point to allow the tracking device to measure relative changes in position and orientation of the object. However, some tracking devices are capable of measuring the relative changes in position and orientation of an object without the need for a marker, which is convenient as it is then not necessary to pre-place a marker on the object.

Tracking devices which do not require a marker may be referred to as markerless tracking devices. The tracking device described in UK Patent Application No. 1418205.9 is an example of a markerless tracking device. Instead of using a marker, a markerless tracking device analyses images generated by illuminating the object (with a radar, lidar or sonar) at different points in time to measure the change in position and orientation of the object relative to the markerless tracking device.

Markerless tracking relies on one or more features of the object which are suitably distinctive and reliably present in the images of the object for the markerless tracking device to be able to measure changes in position and orientation of the object relative to the markerless tracking device. A challenge is to find a beam trajectory which illuminates a portion of the object having suitable features for markerless tracking of the object, particularly when the beam is small compared to the size of the object as there is a choice about the portion of the object to illuminate to generate the images which form the basis of the measurement. An option for selecting the beam trajectory is to rely on the skill and judgement of a human operator to select a suitable beam trajectory. However, training a human operator is expensive and time consuming, and human operators are prone to making mistakes.

It would, therefore, be desirable to find an improved way to select a beam trajectory which does not rely on the skill of a human operator.

A further problem is that if the markerless tracking device moves relative to the object, the beam may illuminate different portions of the object. The images obtained from different portions of the object may look different, which can make it difficult, or even impossible, to compare these images in a way which leads to an accurate measurement of the relative change in position and orientation.

If the markerless tracking device is attached to a vehicle or vessel, the markerless tracking device may move relative to the object in an unpredictable way as the vehicle or vessel moves in response to the environment. For example, a land vehicle on rough ground may be thrown around by lumps or ruts in the ground, and a vessel at sea may bob about on the waves.

A land vehicle on rough ground, a vessel at sea, and an aircraft has six degrees of freedom: surge, sway, yaw, roll, pitch and heave. In order to control the relative position and orientation between an object and a vehicle, vessel or aircraft that is free to move in these six degrees of freedom, it is necessary to measure, and compensate for, movement of the vehicle, vessel or aircraft that is caused by surge, sway and yaw.

Roll, pitch and heave tend to vary in a limited way, and it is not important to measure, or compensate for them, in order to control the relative position and orientation between an object and a vehicle, vessel or aircraft that is free to move in these six degrees of freedom.

However, roll, pitch and heave are nuisance degrees of freedom. Roll, pitch and heave tend to disrupt the ability to measure relative changes in position and orientation caused by surge, sway and yaw because variations in roll, pitch and heave can cause the beam to illuminate different portions of the object. The images from these different portions may look very different which can make it difficult, or even impossible, to compare these images in a way which leads to an accurate measurement of the relative change in position and orientation.

If roll, pitch and heave were to be measured, the beam trajectory could be corrected for the effects of roll, pitch and heave. However, measuring roll, pitch and heave tends to be challenging, expensive and prone to errors.

A vertical reference unit with inertial sensors can obtain a measurement of roll and pitch of a tracking device. However, when the object to be tracked is at a moderate distance (tens to hundreds of metres), even a small residual error in tilt measurements can deflect the beam trajectory significantly so that the beam does not always intersect the same portion of the object. The object to be tracked may also be subject to roll and pitch, and inertial sensors connected to a tracking device cannot measure changes in roll and pitch of the object.

Inertial sensors can be used to measure the heave rate of a tracking device, but if the heave rate is used to estimate the heave, errors can accumulate without bound. Again, if the object to be tracked is subject to heave, inertial sensors on a tracking device cannot help.

It would therefore also be desirable to find a way to make markerless tracking more reliable even when the object or the markerless tracking device are affected by movement due to roll, pitch and heave.

SUMMARY

According to a first aspect of the invention, there is provided a markerless tracking device. The markerless tracking device comprises a source, a sensor and a processor. The source is configured to direct a beam on a plurality of beam paths, where each beam path illuminates a distinct region of an object. The sensor is configured to receive beam reflected from each region in order to generate an image of each region. The processor is configured to generate a metric which indicates suitability of a beam trajectory, wherein the metric is generated by comparing images of selected regions, and wherein the beam trajectory is a path over which the beam is to be directed by the source during markerless tracking of the object.

By generating a metric which indicates suitability of a beam trajectory for use in markerless tracking of the object, the markerless tracking device makes it possible to assess how effective a particular beam trajectory will be for markerless tracking of the object, which helps to improve the reliability and accuracy of markerless tracking. The use of the metric allows a beam trajectory to be automatically assessed for suitability without the need for a human operator to pick an active beam trajectory, which removes the need for a trained human operator with an associated cost saving. It may also increase reliability as the risk of human error is removed. The metric may be more accurate than relying on the judgement of a human operator, as well as being faster.

In this type of markerless tracking, the extent of the beam trajectory is smaller than the size of the object (for example, because the object is a large object, such as an oil rig), so the beam trajectory will only direct a beam to illuminate a portion of the object. For example, a beam trajectory may illuminate a stripe across part of the object as the azimuthal angle of the beam is scanned.

It is desirable when choosing a beam trajectory to consider the portion of the object that is likely to be intersected by a beam following the beam trajectory, especially as not all beam trajectories may be equally suitable for markerless tracking of the object. The metric allows the suitability of a particular beam trajectory to be assessed.

For example, a stripe across a super-structure of a vessel typically results in a complex image which is hard to compare against previous images, and therefore may lead to difficulty in determining relative changes in position and/or orientation between the markerless tracking device and the vessel. A stripe across the super-structure may, therefore, have a metric which indicates that the stripe across the super-structure makes a poor beam trajectory for markerless tracking of the vessel.

In contrast, a stripe across the legs of an oil rig may provide an image which is easier to compare against previous images, and therefore relative changes in position and/or orientation between the markerless tracking device and the oil rig may be determined more easily. A stripe across the legs of an oil rig may, therefore, have a metric which indicates that the stripe across the legs of the oil rig is a good choice for markerless tracking of the oil rig.

Similarly, a stripe across the side of a drill ship may result in an image which is lacking in features, making the image difficult to compare with previous images, leading to problems in determining relative changes in position and/or orientation between the markerless tracking device and the drill ship. A stripe across the side of a drill ship may, therefore, have a metric which indicates that the stripe across the side of the drill ship is a poor choice for markerless tracking of the drill ship.

In contrast, a stripe at the deck level of the drill ship may provide an image having features which make it easier to compare with previous images, leading to the relative changes in position and/or orientation between the markerless tracking device and the drill ship being determined more easily. A stripe at deck level of the drill ship may, therefore, have a metric which indicates that the stripe at deck level is better suited for markerless tracking of the object.

The metric may indicate the suitability of the beam trajectory based on the variability between the images of selected regions. The variability between the images of selected regions may indicate the extent to which an image of the object generated by the beam trajectory would change if the object moved. If there is significant variability between images of selected regions, the metric may indicate that the beam trajectory is less suitable for markerless tracking than if there is little variability between images of selected regions.

The metric indicates whether markerless tracking of the object is likely to be impaired by relative movement between the object and the markerless tracking device in one or more nuisance degrees of freedom (such as roll, pitch and/or heave).

The images of selected regions give an insight into the images that would be obtained (and hence used for determining the relative position and/or orientation change of the object) if the relative motion in one or more of the nuisance degrees of freedom between the object and/or the markerless tracking device were sufficient to cause the beam to move such that the beam were to illuminate the selected regions.

If there is significant variability in the images of selected regions, this may indicate that it will be difficult to compare images at different points in time should there be relative movement between the object and the markerless tracking device caused by one or more of the nuisance degrees of freedom. Therefore, it may be difficult or impossible to determine the relative position and/or orientation change of the object from the images. In this case, the metric may indicate that the beam trajectory is less suitable for markerless tracking of the object.

However, if the selected images indicate that there is little or no variability in the images of selected regions, it may be easier to compare images at different points in time even if the object moves between the images in one or more of the nuisance degrees of freedom. It may therefore be easier to determine the position and/or orientation change of the object from the images. In this case, the metric may indicate that the beam trajectory is more suitable for markerless tracking of the object.

The distribution of selected images around the object may be based on the expected relative change in object position and/or orientation in response to the nuisance degrees of freedom. The distance between selected images may be based on the expected magnitude of the change in position in response to the nuisance degrees of freedom. The arrangement of the selected images may be aligned with the expected direction of movement of the object in response to the nuisance degrees of freedom.

The selected regions may be a pair of regions neighbouring the beam trajectory, that is, one region of the pair of regions located either side of the beam trajectory. An advantage of selecting a pair of neighbouring regions is that only two images need to be stored in a memory of the markerless tracking device.

Alternatively, the selected regions may be a plurality of regions distributed across the object. An advantage of having a plurality of regions distributed across the object is to enable gradual, and long distance, variations in the object to be taken into account by the metric.

The metric may be based on one or more of: a similarity between the images of selected regions; and a positional accuracy achievable from the images of selected regions.

The images of selected regions may be compared by feature mapping. In feature mapping, each image is processed to identify a set of features, and each feature is matched to a feature on a feature map. If necessary, new features may be added to the map. The feature map indicates the relative positions of each feature. In feature mapping, images are compared to the feature map, rather than to other images. Feature mapping may make it difficult to handle features which move relative to other features, or features which look very different when viewed from different angles. If a feature in one image is erroneously matched to a map feature, the map feature will be updated so that the mistake has a lasting effect.

Alternatively, the images of selected regions may be compared by scan-matching the images of the selected regions.

Scan-matching may comprise dense scan-matching. Dense scan-matching comprises comparing individual measurement points in a first image of a scene with individual measurement points in a second image of the scene, without the need to identify specific features in the scene. Dense scan-matching has an advantage of being robust across a wide range of scene types without having to understand the behaviour of features in the scene.

Scan-matching may comprise feature-based scan matching. Feature-based scan matching comprises processing one or more images of a scene to identify one or more features. One or more features in a first image are matched with the corresponding features in a second image. Compared to dense scan-matching, feature-based scan-matching is computationally less intensive. However, feature-based scan-matching requires a reliable feature extractor, and it can be challenging to design a feature extractor which can works reliably over a wide range of scenes.

The metric may be calculated based on the residual error of the scan-matching. Scan-matching may comprise iterative optimisation of the residual errors between the selected images.

The positional accuracy may indicate the expected error in the reported relative position and orientation calculated from the images used in the scan-match.

The metric may be calculated based on one of: residual disparity of the scan-matching; and covariance of the scan-matching.

The processor may be further configured to generate a plurality of metrics, each metric of the plurality of metrics being associated with a respective beam trajectory of a plurality of beam trajectories. The processor may be further configured to select an active beam trajectory from the plurality of beam trajectories based on the plurality of metrics.

In order to determine an active beam trajectory, a plurality of metrics may be determined, where each metric of the plurality of metrics indicates a suitability of a particular beam trajectory for markerless tracking of the object and each metric is calculated by comparing images of selected regions. This allows metrics for multiple beam trajectories across the object to be determined and compared in order to find an active beam trajectory, such as the beam trajectory which is expected to be least affected by relative movement in the nuisance degrees of freedom.

The selected active beam trajectory may have an associated metric which indicates that the active beam trajectory meets a required operational parameter for markerless tracking of the object.

The operational parameter may indicate a required accuracy and an acceptable level of errors of position and/or orientation measurements of the object. For example, the operational parameter may require high position accuracy with occasional large errors, or medium position accuracy with no large errors.

The processor may select the active beam trajectory from beam trajectories of the plurality of beam trajectories having an associated metric that is above a threshold. The use of a threshold enables potential beam trajectories which do not meet a minimum standard to be excluded from further consideration.

The processor may select the active beam trajectory by forming groups of neighbouring beam trajectories of the plurality of beam trajectories that are above a grouping threshold.

The processor may select the active beam trajectory from a group comprising the greatest number of beam trajectories. This favours a group with greater stability (for example, a beam trajectory which is more able to cope with object movement) over a group with the greatest position accuracy.

The active beam trajectory may be selected from a group with a number of beam trajectories which exceeds a group member threshold. In this way, a group may only be considered if there are sufficient members in the group in order to further improve stability.

The markerless tracking device may be further configured to perform markerless tracking of the position and/or orientation of the object based on the active beam trajectory.

The markerless tracking device may be further configured to determine the relative position and/or orientation between the markerless tracking device and the object. The source may direct a beam along the active beam trajectory in order to illuminate a portion of the object. The sensor may be configured to generate first and second images of the portion at different points in time based on the beam reflected from the portion. The processor may be configured to compare the first and second images (for example, by scan-matching the images) to determine the relative position and/or orientation between the markerless tracking device and the object. The markerless tracking device may repeat the process of determining the relative position and/or orientation in order to track changes in the relative position and/or orientation between the markerless tracking device and the object.

The measured changes in relative position and/or orientation of the object may be used to control the relative position and/or orientation between the object and the tracking device. For example, the markerless tracking device may have an output to provide measured changes in position and/or orientation to a dynamic positioning system. The dynamic positioning system may use the measured changes in position and/or orientation as a feedback which controls a propulsion system on a vessel to control the relative position and/or orientation between the vessel and the object.

The processor may be configured to switch between a first mode in which the processor is configured to select an active beam trajectory of the object and a second mode comprising markerless tracking of the object.

Before the markerless tracking device commences markerless tracking of the object, and before control of the relative position and/or orientation between the markerless tracking device and the object begins, the markerless tracking device may operate in the first mode where an active beam trajectory is determined. Once the active beam trajectory is determined, the markerless tracking device may switch to operating in the second mode where markerless tracking of the object commences, and control of the relative position and/or orientation to the object may begin.

Once the markerless tracking device switches to the second mode, the markerless tracking device may not switch back to the first mode while the output from the markerless tracking device is being used to control the relative position and/or orientation to the object. This helps to prevent damage, or disruption to operations, that might occur if the control of relative position and/orientation to the object were to cease.

Switching from the first mode to the second mode may occur only when it has been determined that the active beam trajectory is suitable for the entire duration over which it is desired to control the relative position and/or orientation between the markerless tracking device and the object, such as over the lifetime or duration of an operation.

The markerless tracking device may be configured to refine the active beam trajectory while simultaneously tracking the object. In the first mode, the markerless tracking device can be said to comprise a global search for the active beam trajectory. Refining the active beam trajectory in the second mode can be considered to be a local optimisation of the active beam trajectory, where images of regions of the object which are close to the active beam trajectory (such as within 5° or 10° either side of the active beam trajectory) are compared to determine whether an alternative beam trajectory should now be selected as the active beam trajectory.

Local optimisation may be necessary as a vessel is being unloaded, because unloading of the vessel affects the buoyancy of the vessel causing the beam to move upwards. In this case, local optimisation may involve moving the active beam trajectory downwards to compensate for the upwards movement of the vessel.

Local optimisation of the active beam trajectory may be necessary when a change in distance between the object and a position at which the active beam trajectory was selected exceeds a distance threshold.

Local optimisation may also be necessary when a residual error in scan-matching images generated by the active beam trajectory exceeds a threshold. This indicates that the active beam trajectory is no longer able to support accurate and reliable determination of the relative position and/or orientation of the object, for example, because the object has moved significantly since the active beam trajectory was determined.

The beam may be a radar beam and the images may be radar images. The radar beam may be a pulsed radar beam or a modulated continuous wave radar beam.

The beam may be a laser beam and the images may be lidar images. The laser beam may be a pulsed laser and distance information may be determined based on time of flight of the pulses.

The beam may be a sonar beam and the images may be sonar images.

Directing the beam may comprise scanning the beam in azimuth and elevation to illuminate each region of the object. Alternatively, directing the beam may comprise generating a plurality of beams, each beam of the plurality of beams configured to illuminate a respective region. Generating a plurality of beams is advantageous because multiple regions may be illuminated simultaneously.

According to a second aspect of the invention, there is provided a method of markerless tracking of an object. The method comprises directing a beam on a plurality of beam paths where each beam path illuminates a distinct region of the object. An image of each region is generated, wherein the image of each region is based on the beam reflected from the respective region. Images of selected regions are compared to generate a metric which indicates suitability of a beam trajectory for use in markerless tracking of the object, wherein the beam trajectory is a path over which the beam is to be directed during markerless tracking of the object.

By generating a metric which indicates suitability of a beam trajectory for use in markerless tracking of the object, the method makes it possible to assess how effective a particular beam trajectory will be for markerless tracking of the object, which helps to improve the reliability and accuracy of markerless tracking. The use of the metric allows a beam trajectory to be automatically assessed for suitability without the need for a human operator to pick an active beam trajectory, which removes the need for a trained human operator with an associated cost saving. It may also increase reliability as the risk of human error is removed. The metric may be more accurate than relying on the judgement of a human operator, as well as being faster.

In this type of markerless tracking, the extent of the beam trajectory is smaller than the size of the object (for example, because the object is a large object, such as an oil rig), so the beam trajectory will only direct a beam to illuminate a portion of the object. For example, a beam trajectory may illuminate a stripe across part of the object as the azimuthal angle of the beam is scanned.

It is desirable when choosing a beam trajectory to consider the portion of the object that is likely to be intersected by a beam following the beam trajectory, especially as not all beam trajectories may be equally suitable for markerless tracking of the object. The metric allows the suitability of a particular beam trajectory to be assessed.

For example, a stripe across a super-structure of a vessel typically results in a complex image which is hard to compare against previous images, and therefore may lead to difficulty in determining relative changes in position and/or orientation between the vessel and the measurement position (that is, the position from which the beam is emitted and detected, such as at a markerless tracking device). A stripe across the super-structure may, therefore, have a metric which indicates that the stripe across the super-structure makes a poor beam trajectory for markerless tracking of the vessel.

In contrast, a stripe across the legs of an oil rig may provide an image which is easier to compare against previous images, and therefore relative changes in position and/or orientation between the measurement position and the oil rig may be determined more easily. A stripe across the legs of an oil rig may, therefore, have a metric which indicates that the stripe across the legs of the oil rig is a good choice for markerless tracking of the oil rig.

Similarly, a stripe across the side of a drill ship may result in an image which is lacking in features, making the image difficult to compare with previous images, leading to problems in determining relative changes in position and/or orientation between the measurement position and the drill ship. A stripe across the side of a drill ship may, therefore, have a metric which indicates that the stripe across the side of the drill ship is a poor choice for markerless tracking of the drill ship.

In contrast, a stripe at the deck level of the drill ship may provide an image having features which make it easier to compare with previous images, leading to the relative changes in position and/or orientation between the measurement position and the drill ship being determined more easily. A stripe at deck level of the drill ship may, therefore, have a metric which indicates that the stripe at deck level is better suited for markerless tracking of the object.

The metric may indicate the suitability of the beam trajectory based on the variability between the images of selected regions. The variability between the images of selected regions may indicate the extent to which an image of the object generated by the beam trajectory would change if the object moved. If there is significant variability between images of selected regions, the metric may indicate that the beam trajectory is less suitable for markerless tracking than if there is little variability between images of selected regions.

The metric indicates whether markerless tracking of the object is likely to be impaired by relative movement to the object in one or more nuisance degrees of freedom (such as roll, pitch and/or heave).

The images of selected regions give an insight into the images that would be obtained (and hence used for determining the relative position and/or orientation change of the object) if the relative motion in one or more of the nuisance degrees of freedom between the object and/or the measuring position were sufficient to cause the beam to move such that the beam were to illuminate the selected regions.

If there is significant variability in the images of selected regions, this may indicate that it will be difficult to compare images at different points in time should there be relative movement between the object and the measuring position caused by one or more of the nuisance degrees of freedom. Therefore, it may be difficult or impossible to determine the relative position and/or orientation change of the object from the images. In this case, the metric may indicate that the beam trajectory is less suitable for markerless tracking of the object.

However, if the selected images indicate that there is little or no variability in the images of selected regions, it may be easier to compare images at different points in time even if the object moves between the images in one or more of the nuisance degrees of freedom. It may therefore be easier to determine the position and/or orientation change of the object from the images. In this case, the metric may indicate that the beam trajectory is more suitable for markerless tracking of the object.

The distribution of selected images around the object may be based on the expected relative change in object position and/or orientation in response to the nuisance degrees of freedom. The distance between selected images may be based on the expected magnitude of the change in position in response to the nuisance degrees of freedom. The arrangement of the selected images may be aligned with the expected direction of movement of the object in response to the nuisance degrees of freedom.

The selected regions may be a pair of regions neighbouring the beam trajectory, that is, one region of the pair of regions located either side of the beam trajectory. An advantage of selecting a pair of neighbouring regions is that only two images need to be stored in a memory of the markerless tracking device.

Alternatively, the selected regions may be a plurality of regions distributed across the object. An advantage of having a plurality of regions distributed across the object is to enable gradual, and long distance, variations in the object to be taken into account by the metric.

The metric may be based on one or more of: a similarity between the images of selected regions; and a positional accuracy achievable from the images of selected regions.

The images of selected regions may be compared by feature mapping. In feature mapping, each image is processed to identify a set of features, and each feature is matched to a feature on a feature map. If necessary, new features may be added to the map. The feature map indicates the relative positions of each feature. In feature mapping, images are compared to the feature map, rather than to other images. Feature mapping may make it difficult to handle features which move relative to other features, or features which look very different when viewed from different angles. If a feature in one image is erroneously matched to a map feature, the map feature will be updated so that the mistake has a lasting effect.

Alternatively, the images of selected regions may be compared by scan-matching the images of the selected regions.

Scan-matching may comprise dense scan-matching. Dense scan-matching comprises comparing individual measurement points in a first image of a scene with individual measurement points in a second image of the scene, without the need to identify specific features in the scene. Dense scan-matching has an advantage of being robust across a wide range of scene types without having to understand the behaviour of features in the scene.

Scan-matching may comprise feature-based scan matching. Feature-based scan matching comprises processing one or more images of a scene to identify one or more features. One or more features in a first image are matched with the corresponding features in a second image. Compared to dense scan-matching, feature-based scan-matching is computationally less intensive. However, feature-based scan-matching requires a reliable feature extractor, and it can be challenging to design a feature extractor which can works reliably over a wide range of scenes.

The metric may be calculated based on the residual error of the scan-matching. Scan-matching may comprise iterative optimisation of the residual errors between the selected images.

The positional accuracy may indicate the expected error in the reported relative position and orientation calculated from the images used in the scan-match.

The metric may be calculated based on one of: residual disparity of the scan-matching; and covariance of the scan-matching.

The method may further comprise generating a plurality of metrics, each metric of the plurality of metrics being associated with a respective beam trajectory of a plurality of beam trajectories. The method may further comprise selecting an active beam trajectory from the plurality of beam trajectories based on the plurality of metrics.

In order to determine an active beam trajectory, a plurality of metrics may be determined, where each metric of the plurality of metrics indicates a suitability of a particular beam trajectory for markerless tracking of the object and each metric is calculated by comparing images of selected regions. This allows metrics for multiple beam trajectories across the object to be determined and compared in order to find an active beam trajectory, such as the beam trajectory which is expected to be least affected by relative movement in the nuisance degrees of freedom.

The selected active beam trajectory may have an associated metric which indicates that the active beam trajectory meets a required operational parameter for markerless tracking of the object.

The operational parameter may indicate a required accuracy and an acceptable level of errors of position and/or orientation measurements of the object. For example, the operational parameter may require high position accuracy with occasional large errors, or medium position accuracy with no large errors.

The method may further comprise selecting the active beam trajectory from beam trajectories of the plurality of beam trajectories having an associated metric that is above a threshold. The use of a threshold enables potential beam trajectories which do not meet a minimum standard to be excluded from further consideration.

The method may further comprise selecting the active beam trajectory by forming groups of neighbouring beam trajectories of the plurality of beam trajectories that are above a grouping threshold.

The method may further comprise selecting the active beam trajectory from a group comprising the greatest number of beam trajectories. This favours a group with greater stability (for example, a beam trajectory which is more able to cope with object movement) over a group with the greatest position accuracy.

The active beam trajectory may be selected from a group with a number of beam trajectories which exceeds a group member threshold. In this way, a group may only be considered if there are sufficient members in the group in order to further improve stability.

The method may further comprise performing markerless tracking of the position and/or orientation of the object based on the active beam trajectory.

The method may further comprise determining the relative position and/or orientation between the measurement position and the object. A beam may be directed along the active beam trajectory in order to illuminate a portion of the object. First and second images of the portion at different points in time may be generated based on the beam reflected from the portion. The first and second images may be compared (for example, by scan-matching the images) to determine the relative position and/or orientation between the measurement position and the object. The process of determining the relative position and/or orientation may be repeated in order to track changes in the relative position and/or orientation between the measurement position and the object.

The measured changes in relative position and/or orientation of the object may be used to control the relative position and/or orientation between the object and the measurement position. For example, measured changes in position and/or orientation may be provided to a dynamic positioning system. The dynamic positioning system may use the measured changes in position and/or orientation as a feedback which controls a propulsion system on a vessel to control the relative position and/or orientation between the vessel and the object.

The method may further comprise switching between a first mode in which an active beam trajectory is selected and a second mode comprising markerless tracking of the object.

Before markerless tracking of the object commences, and before control of the relative position and/or orientation between the measurement position and the object begins, the method may operate in the first mode where an active beam trajectory is determined. Once the active beam trajectory is determined, the method may switch to operating in the second mode where markerless tracking of the object commences, and control of the relative position and/or orientation between the measurement position and the object may begin.

Once the method switches to the second mode, the method may not switch back to the first mode while the relative position and/or orientation between the measurement position and the object is being controlled. This helps to prevent damage, or disruption to operations, that might occur if the control of relative position and/orientation between the measurement position and the object were to cease.

Switching from the first mode to the second mode may occur only when it has been determined that the active beam trajectory is suitable for the entire duration over which it is desired to control the relative position and/or orientation between the measurement position and the object, such as over the lifetime or duration of an operation.

The method may further comprise refining the active beam trajectory while simultaneously tracking the object. In the first mode, the method can be said to comprise a global search for the active beam trajectory. Refining the active beam trajectory in the second mode can be considered to be a local optimisation of the active beam trajectory, where images of regions of the object which are close to the active beam trajectory (such as within 5° or 10° either side of the active beam trajectory) are compared to determine whether an alternative beam trajectory should now be selected as the active beam trajectory.

Local optimisation may be necessary as a vessel is being unloaded, because unloading of the vessel affects the buoyancy of the vessel causing the beam to move upwards. In this case, local optimisation may involve moving the active beam trajectory downwards to compensate for the upwards movement of the vessel.

Local optimisation of the active beam trajectory may be necessary when a change in distance between the object and a position at which the active beam trajectory was selected exceeds a distance threshold.

Local optimisation may also be necessary when a residual error in scan-matching images generated by the active beam trajectory exceeds a threshold. This indicates that the active beam trajectory is no longer able to support accurate and reliable determination of the relative position and/or orientation of the object, for example, because the object has moved significantly since the active beam trajectory was determined.

The beam may be a radar beam and the images may be radar images. The radar beam may be a pulsed radar beam or a modulated continuous wave radar beam.

The beam may be a laser beam and the images may be lidar images. The laser beam may be a pulsed laser and distance information may be determined based on time of flight of the pulses.

The beam may be a sonar beam and the images may be sonar images.

Directing the beam may comprise scanning the beam in azimuth and elevation to illuminate each region of the object. Alternatively, directing the beam may comprise generating a plurality of beams, each beam of the plurality of beams configured to illuminate a respective region. Generating a plurality of beams is advantageous because multiple regions may be illuminated simultaneously.

BRIEF DESCRIPTION OF THE DRAWINGS

The invention shall now be described, by way of example only, with reference to the accompanying drawings, in which.

DETAILED DESCRIPTION

Figure 1:
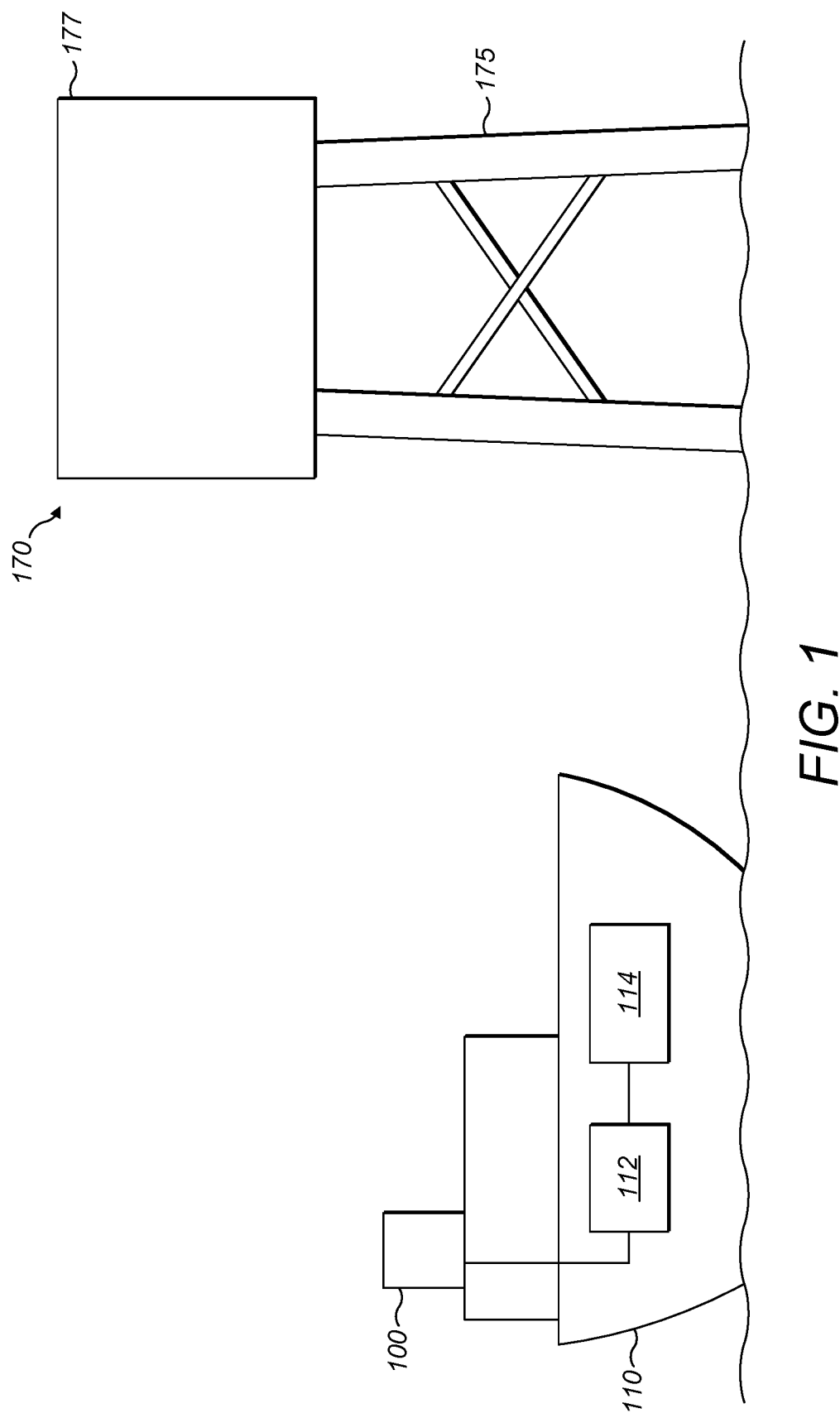
FIG. 1 illustrates a markerless tracking device attached to a platform supply vessel controlling the position and orientation between the platform supply vessel and an oil rig.

FIG. 1 illustrates a markerless tracking device 100 attached to a vessel, in this case a platform supply vessel 110. The markerless tracking device 100 is tracking changes in the relative position and orientation between the markerless tracking device 100 and an object, in this case an oil rig 170. The changes in relative position and orientation are caused by the platform supply vessel 110 moving in response to the sea state.

The relative changes in position and orientation recorded by the markerless tracking device 100 are being used as a feedback to a dynamic positioning system 112 on the platform supply vessel 110. The dynamic positioning system 112 is controlling thrusters 114 in order to keep the platform supply vessel 110 at a constant distance and fixed orientation with respect to the oil rig 170.

Figure 2:
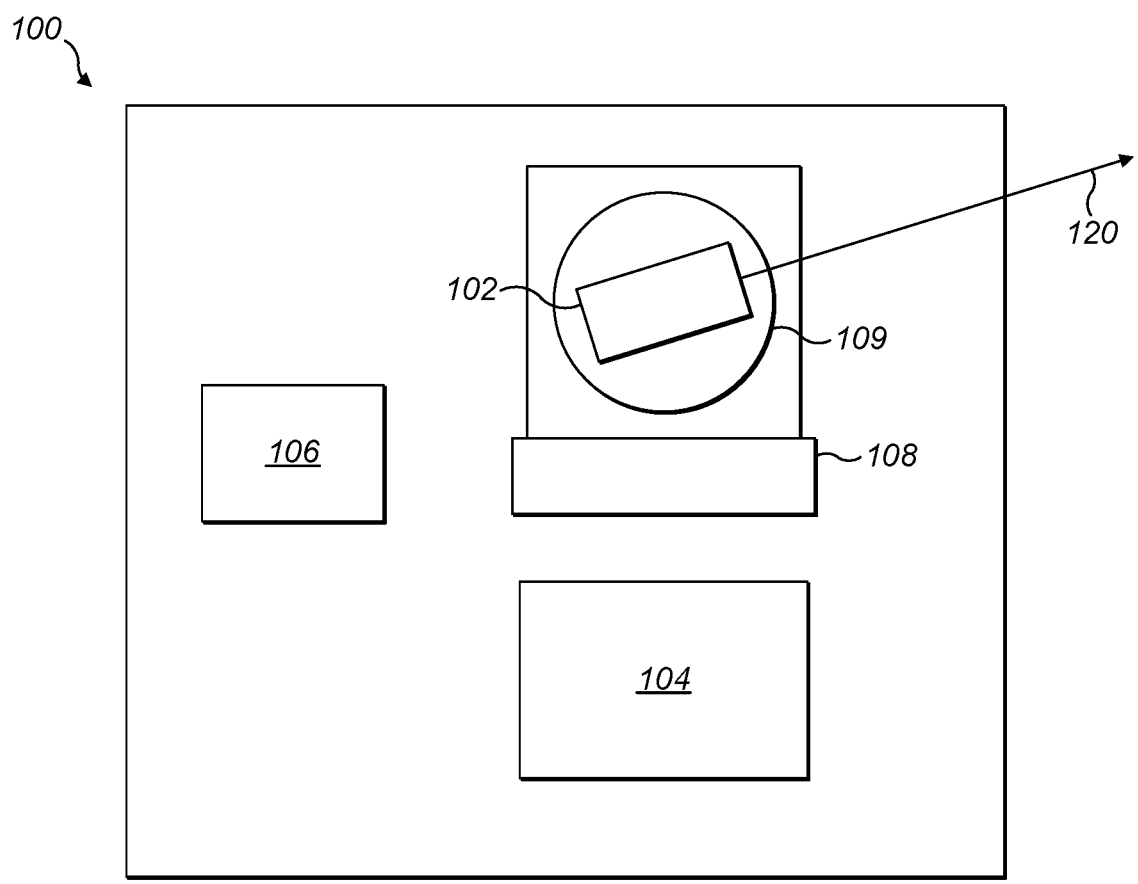
FIG. 2 illustrates the markerless tracking device of FIG. 1.
Figure 3:
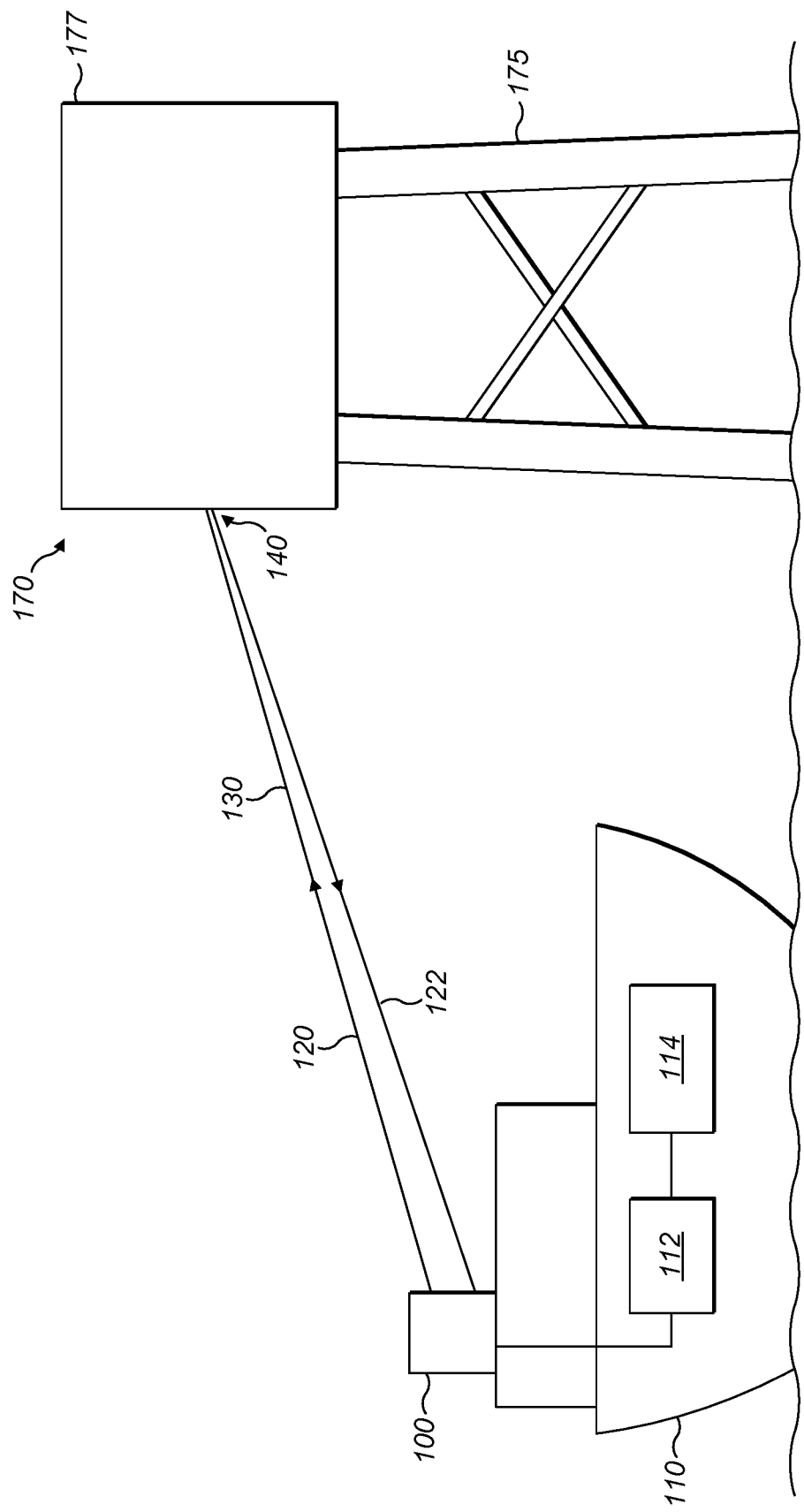
FIG. 3 illustrates the markerless tracking device controlling the position and orientation between the platform supply vessel and the oil rig based on a beam trajectory.

As shown in FIG. 2, the markerless tracking device 100 has a source 102 which emits a beam 120 (such as a radar or lidar beam). The processor 106 controls a pair of orthogonal rotation stages 108 and 109 to which the source 102 is attached. The rotation stage 108 controls the azimuthal angle of the beam 120 and the rotation stage 109 controls the elevation angle of the beam 120. By controlling the azimuthal and elevation angle of the beam 120, the beam 120 can be made to follow a beam trajectory 130 which illuminates a portion 140 of the oil rig 170 (as shown in FIGS. 3 and 4).

Figure 4:
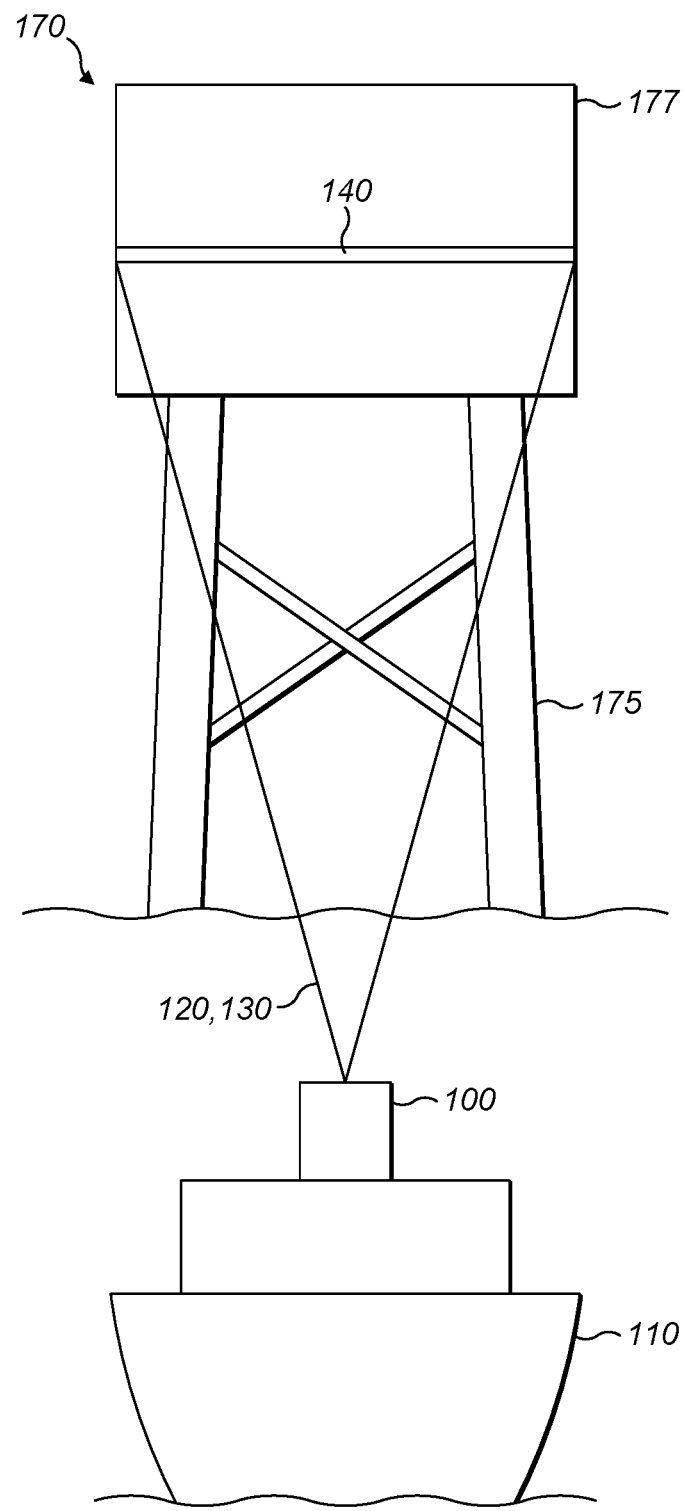
FIG. 4 illustrates the region of the oil rig illuminated by the beam trajectory of FIG. 3.

As shown in FIG. 4, the portion 140 is, in this case, a stripe-shaped portion 140 of the superstructure 177 of the oil rig 170 which has been illuminated by rotation of the source 102 on rotation stage 108 while holding rotation stage 109 in a fixed position to fix the elevation angle of the beam 120.

A reflected beam 122 is reflected by portion 140. The reflected beam 122 is received by the sensor 104. The sensor 104 uses the reflected beam 122 to generate first and second images of the region 140 at different points in time.

The processor 106 compares the first and second images using a dense scan-matching algorithm (such as the dense scan-matching algorithm described in UK Patent Application No. 1418205.9) to determine the change in relative position and orientation between the platform supply vessel 110 and the oil rig 170 between the first and second images.

The change in relative position and orientation is fed to the dynamic positioning system 112 which uses the change in relative position and orientation to control thrusters 114 to maintain a fixed position and orientation between the platform supply vessel 110 and the oil rig 170.

Markerless tracking relies on one or more features of the oil rig 170 which are suitably distinctive and reliably present in the first and second images of the oil rig 170 for the markerless tracking device 100 to be able to measure changes in position and orientation of the oil rig 170 relative to the markerless tracking device 100. The beam 120 illuminates a portion 140 which is small compared to the overall size of the oil rig 170. It is, therefore, necessary to find a beam trajectory 130 which illuminates a portion 140 of the oil rig 170 having suitable features for markerless tracking of the oil rig 170. To find a suitable beam trajectory 130, it is useful to have a metric which allows the suitability of different beam trajectories 130 to be compared.

Figure 5:
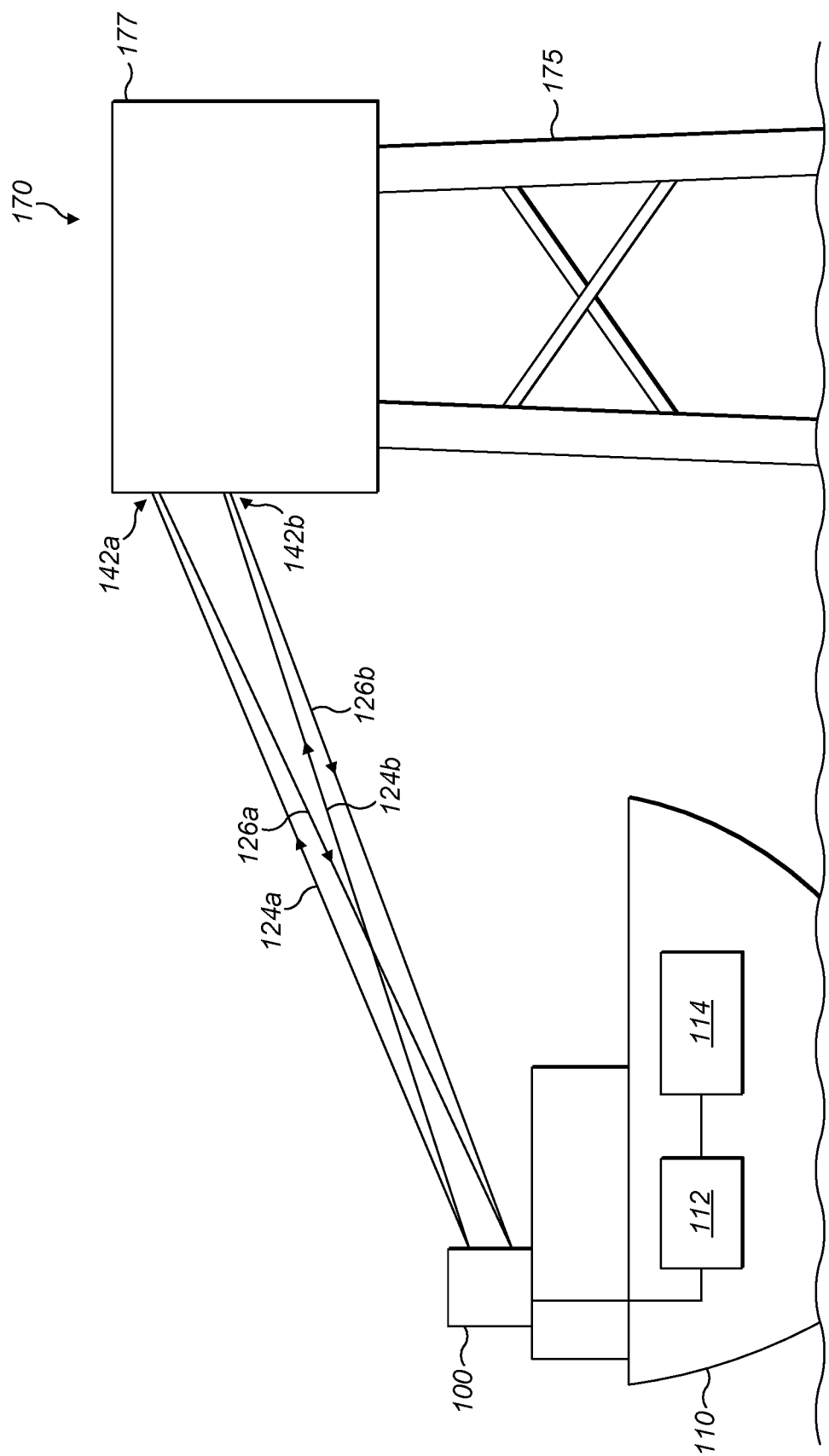
FIG. 5 illustrates the markerless tracking device assessing the suitability of a beam trajectory on the superstructure of the oil rig.
Figure 6:
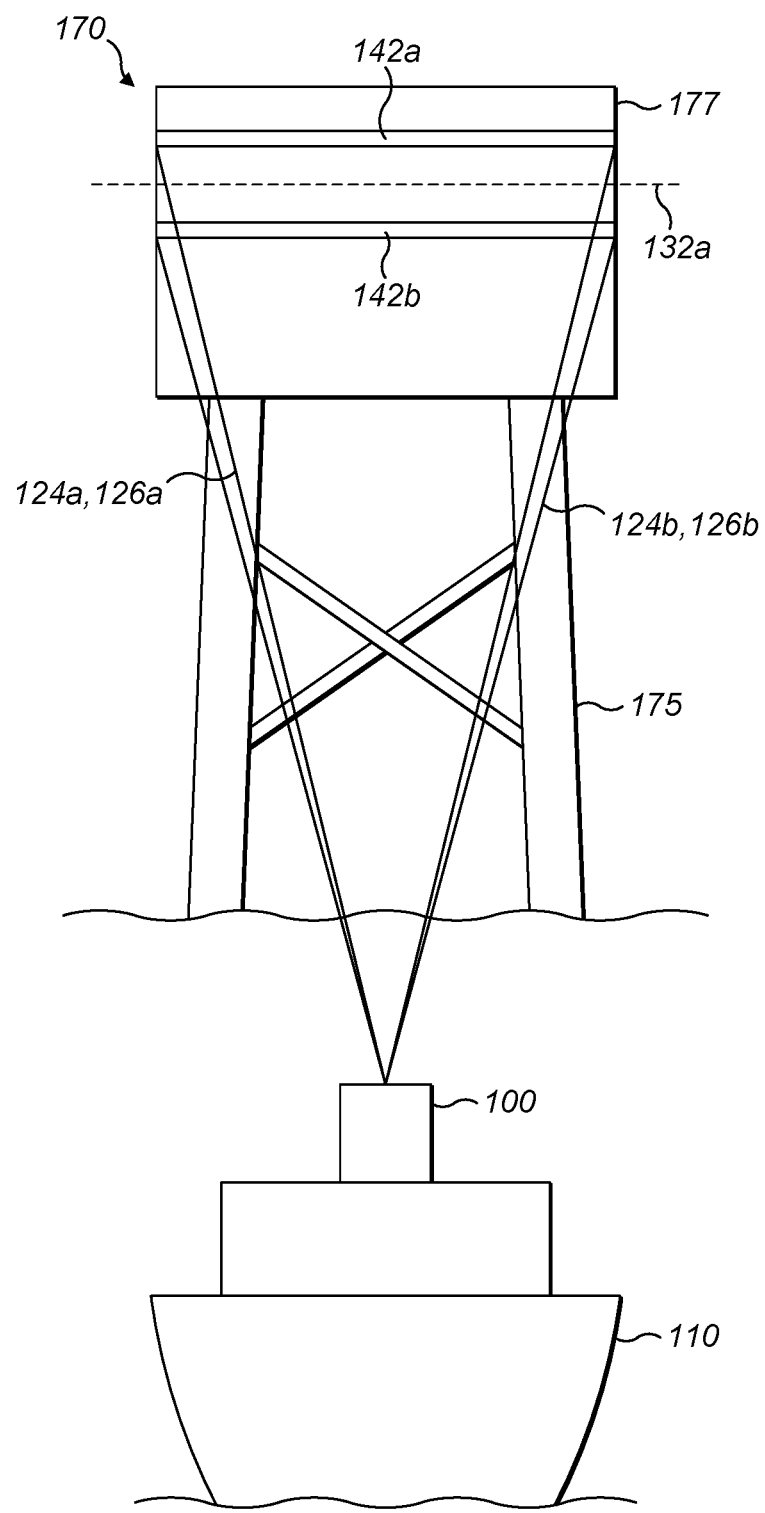
FIG. 6 illustrates the regions of the superstructure of the oil rig that are illuminated in FIG. 5.

FIGS. 5 and 6 illustrate how the markerless tracking device 100 determines a metric which indicates the suitability of a proposed beam trajectory 132a across the superstructure level 177 of the oil rig 170.

The source 102 emits a first beam 124a which illuminates a region 142a of the superstructure 177 of the oil rig 175. A reflected beam 126a is picked up by the sensor 104 which generates an image of the region 142a.

The source 102 emits a second beam 124b which illuminates a different region 142b of the superstructure 177 of the oil rig 175. A reflected beam 126b is picked up by the sensor 104 which generates an image of the region 142b.

The processor 106 scan-matches the images of regions 142a and 142b and generates a metric for a proposed beam trajectory 132a across the superstructure 177 which lies between the two regions 142a and 142b.

After determining a metric for the first proposed beam trajectory 132a, the markerless tracking device 100 may determine a metric for one or more further proposed beam trajectories. For example, the markerless tracking device 100 may determine a metric for a second proposed beam trajectory 132b so that the metrics of the first 132a and second 132b proposed beam trajectories can be compared to see which beam trajectory might be more suitable for use in markerless tracking of the oil rig 170.

Figure 7:
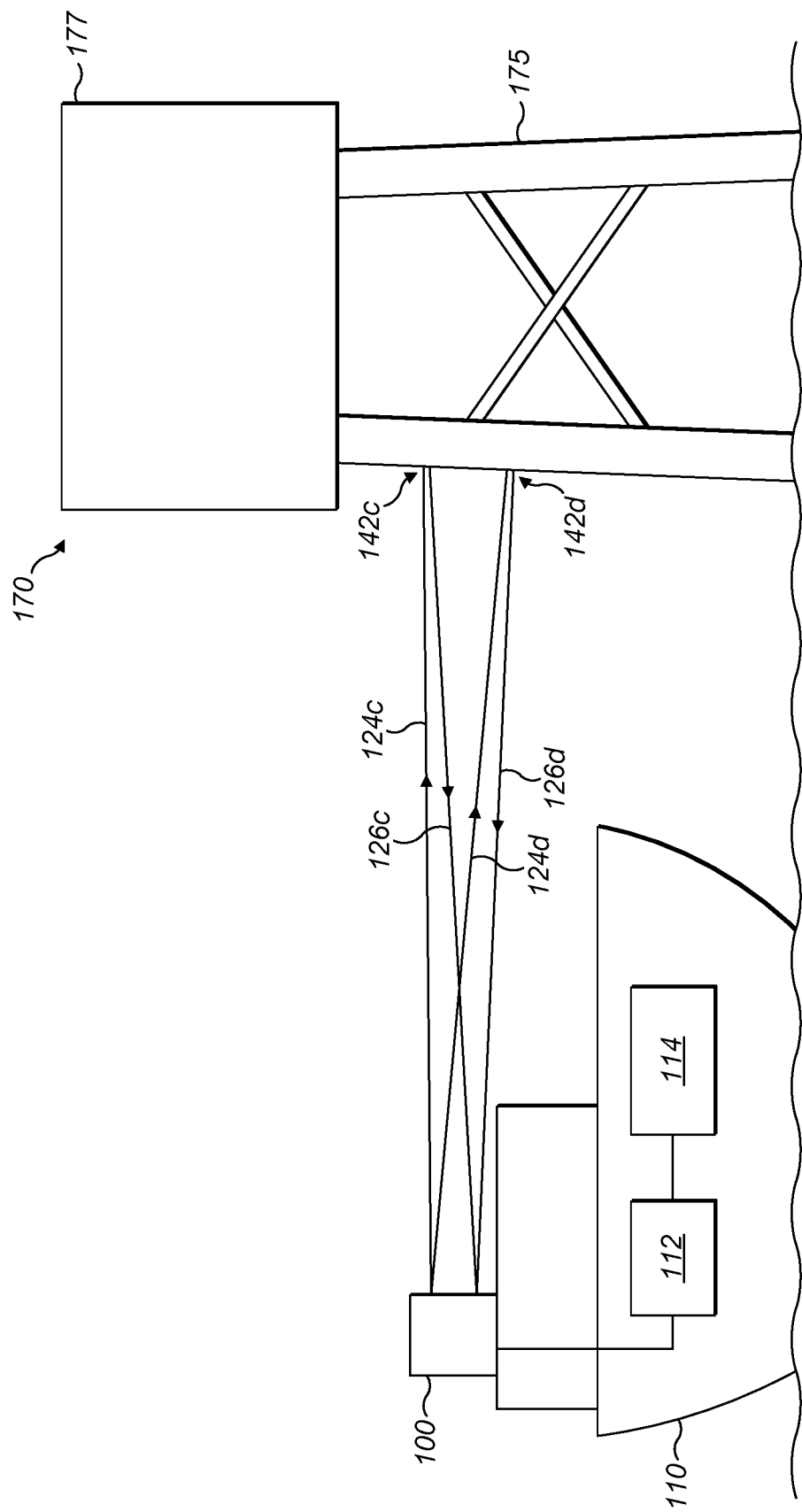
FIG. 7 illustrates the markerless tracking device assessing the suitability of a beam trajectory on the legs of the oil rig.
Figure 8:
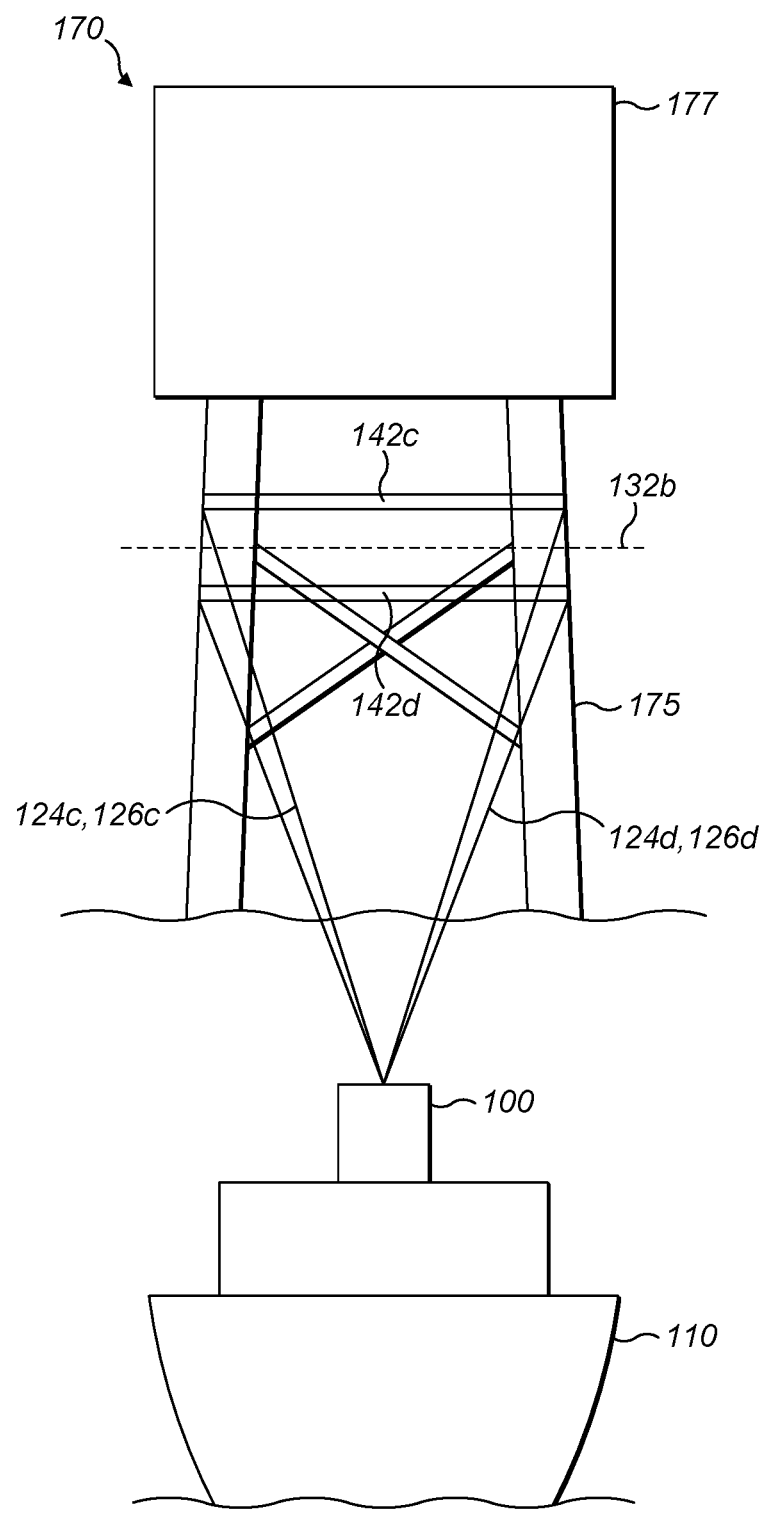
FIG. 8 illustrates the regions of the legs of the oil rig that are illuminated in FIG. 7.

FIGS. 7 and 8 illustrate how the markerless tracking device 100 determines a metric which indicates the suitability of a second proposed beam trajectory 132b across the legs 175 of the oil rig 170.

The source 102 emits a first beam 124c which illuminates a region 142c of the legs 175 of the oil rig 170. A reflected beam 126c is picked up by the sensor 104 which generates an image of the region 142c.

The source 102 emits a second beam 124d which illuminates a region 142d of the legs 175 of the oil rig 170. A reflected beam 126*d* is picked up by the sensor 104 which generates an image of the region 142*d*.

The processor 106 scan-matches the images of regions 142*c* and 142*d* and generates a metric for a proposed beam trajectory 132*b* across the legs 175 which lies between the two regions 142*c* and 142*d*.

The images of regions 142*a* and 142*b* give an insight into the images that could be obtained for beam trajectory 132*a* if the relative motion in one or more of the nuisance degrees of freedom (such as roll, pitch and/or heave) between the oil rig 170 and the platform supply vessel 110 were sufficient to cause the beam 120 to move between illuminating regions 142*a* and 142*b*. Similarly, the images of regions 142*c* and 142*d* give an insight into the images that could be obtained for beam trajectory 132*b* if the relative motion in one or more of the nuisance degrees of freedom (such as roll, pitch and/or heave) between the oil rig 170 and the platform supply vessel 110 were sufficient to cause the beam 120 to move between illuminating regions 142*a* and 142*b*.

There is less variability between the images associated with regions 142*a* and 142*b* across the superstructure 177 than there is for the images associated with regions 142*c* and 142*d* across the legs 175. As a result of there being less variability in the images associated with regions 142*a* and 142*b*, scan-matching images of these regions is easier and less prone to error. As a result, the beam trajectory 132*a* will be better for markerless tracking of the oil rig 170 because beam trajectory 132*a* will be less prone to errors if the platform supply vessel 110 moves under the influence of the nuisance degrees of freedom. For these reasons, the metric indicates that the beam trajectory 132*a*, across the superstructure 177 of oil rig 170, is better for markerless tracking of the oil rig 170 than the beam trajectory 132*b* across the legs 175 of the oil rig 170.

As a result, beam trajectory 132*a* is selected as the active beam trajectory and the markerless tracking device 100 switches to a tracking mode. In the tracking mode, the markerless tracking device 100 directs the beam, using rotation stages 108 and 109, to follow the active beam trajectory 132*a* during markerless tracking of the oil rig 170.

Figure 9:
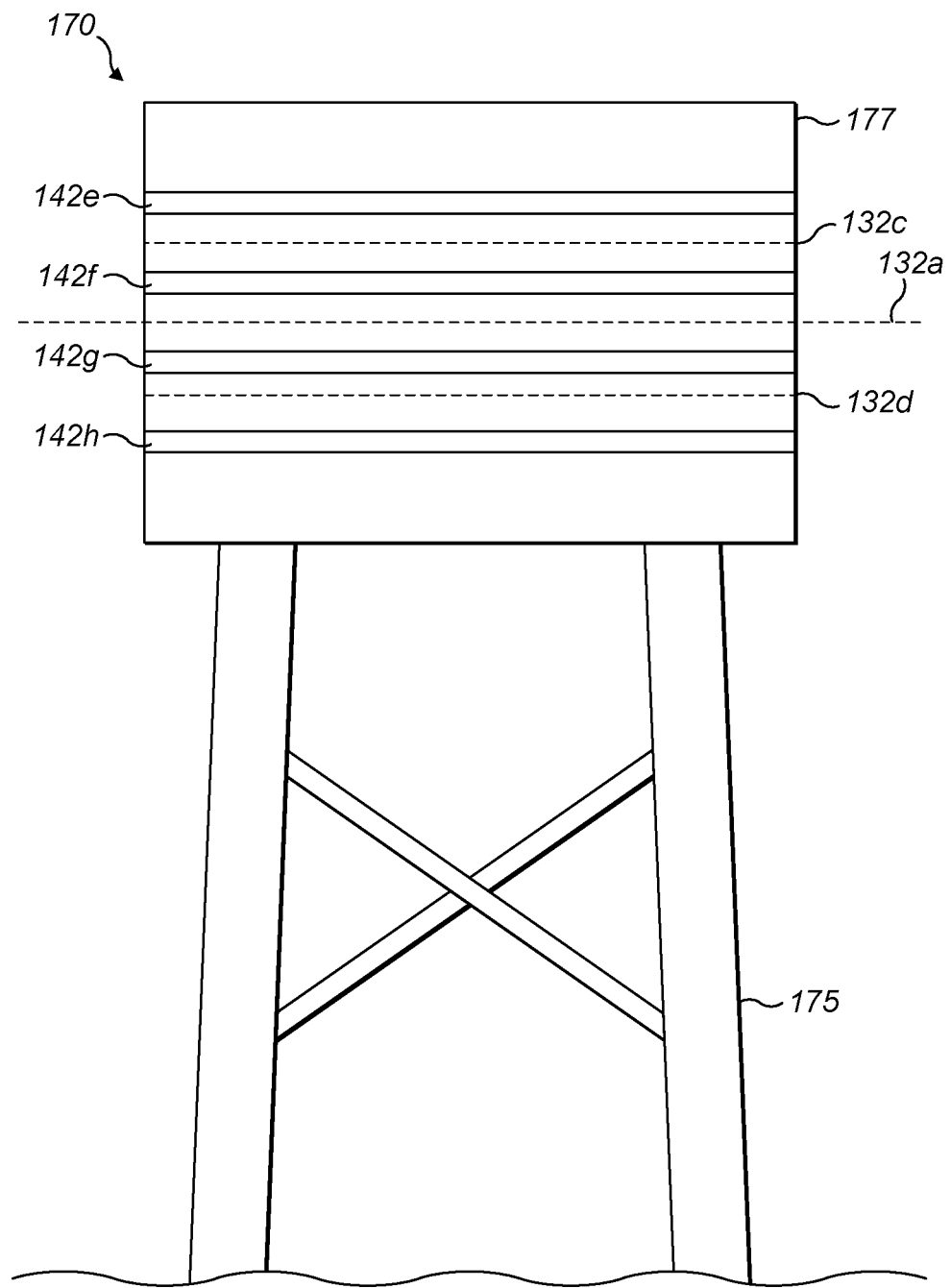
FIG. 9 illustrates the markerless tracking device refining the active beam trajectory.

Referring now to FIG. 9, at some point after markerless tracking of the oil rig 170 has commenced (such as after a period of time has elapsed, or the distance between the platform supply vessel 110 and the oil rig 170 has changed by more than a threshold amount) the markerless tracking device 100 may scan regions which are close to the active beam trajectory 132*a*, to see if a different beam trajectory would now make a better choice of active beam trajectory. The markerless tracking device 100 scans these close regions at the same time that the markerless tracking device 100 is still tracking the oil rig 170 so that the position and orientation between the platform supply vessel 110 and the oil rig 170 can still be controlled to ensure that the platform supply vessel 110 does not crash into the oil rig 170.

The markerless tracking device 100 directs the beam to scan regions 142*e* and 142*f* to determine whether a beam trajectory 132*c* would now be a better choice as active beam trajectory 132*a*. The markerless tracking device 100 may also direct the beam to scan regions 142*g* and 142*h* to determine whether a beam trajectory 132*d* would now be a better choice than the active beam trajectory 132*a*. The markerless tracking device 100 switches the active beam trajectory to the beam trajectory of beam trajectories 132*a*, 132*c* and 132*d* which has a metric which indicates that the beam trajectory is now the best choice for markerless tracking of the oil rig 170.

Turning now to calculating the metric. The metric has two elements—a stability metric which is calculated based on the similarity of images associated with the regions either side of the proposed beam trajectory; and a position accuracy metric related to the positional accuracy achievable from images associated with the regions either side of the proposed beam trajectory. For example, the metric for the beam trajectory 132*a* is based on the images associated with the regions 142*a* and 142*b* either side of the beam trajectory 132*a*.

An image of a region is captured and stored as a reference image. A current image of a different region is then captured. The reference image and the current image are scan-matched by iterative optimisation of the residual errors between the reference image and the current image. For example, the reference image may be an image of region 142*a* and the current image may be an image of region 142*b*. The residual errors are calculated using a distance transform.

The similarity metric is then derived from the final residual error of the scan-match after iterative optimisation as follows:

$$\text{similarity} = \frac{error_{max} - error_{final}}{error_{max} - error_{min}}, \quad (1)$$

where:

$error_{min}$ is the average residual error for each point in the reference image when comparing the reference image to itself ($error_{min}$ is not zero due to quantisation errors and filtering effects);

$error_{max}$ is a property of the reference image and is related to outlier distance, specifically the maximum residual error possible when comparing a point in the current image to a point in the reference image ($error_{max}$ prevents outliers from having a significant effect on the scan-matching); and $error_{final}$ is the average residual error for each point in the current image after scan-matching against the reference image.

The similarity metric is not commutative, so changing the image that is selected as the reference image may change the value calculated for the similarity metric. To correct for this, the similarity metric may be calculated (as described above), then the reference image and the current image may be swapped (that is, the reference image becomes the current image and the current image becomes the reference image) and the similarity metric may be recalculated. An average may be taken of the calculated and recalculated similarity metrics.

The position accuracy metric is calculated from a covariance matrix derived from the final residual error gradients. From the final residual error gradients, we calculate a Jacobian matrix from which a covariance matrix is calculated as follows:

$$\text{Covariance} = (J^T J)^{-1} \quad (2)$$

So far, it has been described how beam trajectories 132*a* and 132*b* could be compared in order to determine which beam trajectory of the beam trajectories 132*a* and 132*b* is to be selected as the active beam trajectory. However, any number of beam trajectories could be compared to select the most suitable active beam trajectory.

Figure 10:
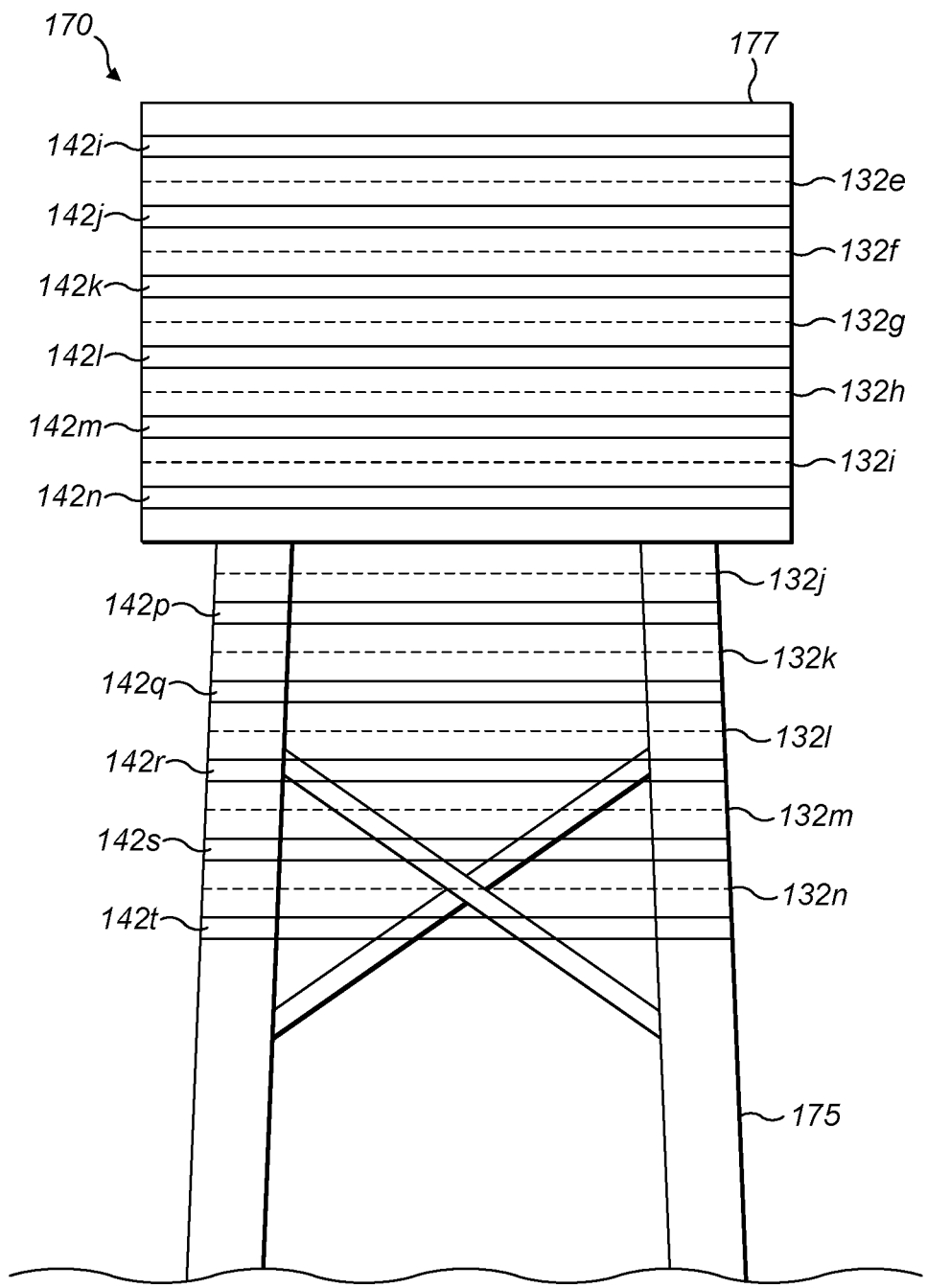
FIG. 10 illustrates the markerless tracking device assessing the suitability of multiple beam trajectories across the oil rig to select the active beam trajectory.

FIG. 10 illustrates the markerless tracking device 100 calculating metrics for ten beam trajectories 132*e*-132*n* based on pairs of regions 142*i*-142*t* across the oil rig 170 to work out which of the beam trajectory 132e-132n represents the best choice for selecting as the active beam trajectory.

The markerless tracking device 100 may start at the top of the oil rig 170, generating an image of region 142i which is stored as a reference image. The markerless tracking device 100 then generates an image of region 142j which is stored as the current image. The current image of region 142j is compared against the reference image of region 142i to calculate a metric for beam trajectory 132e.

Next, the current image of region 142j is stored as the reference image. To save memory, the previous reference image, which is no longer needed, is overwritten. The markerless tracking device 100 then generates an image of region 142k which is stored as the current image, overwriting the previously stored current image to save memory. The current image of region 142k is compared against the reference image of region 142j to calculate the metric for beam trajectory 132f.

The markerless tracking device 100 continues this process, comparing all neighbouring pairs of images, until the final two regions 142s and 142t are compared to calculate the metric for beam trajectory 132n.

Figure 11:
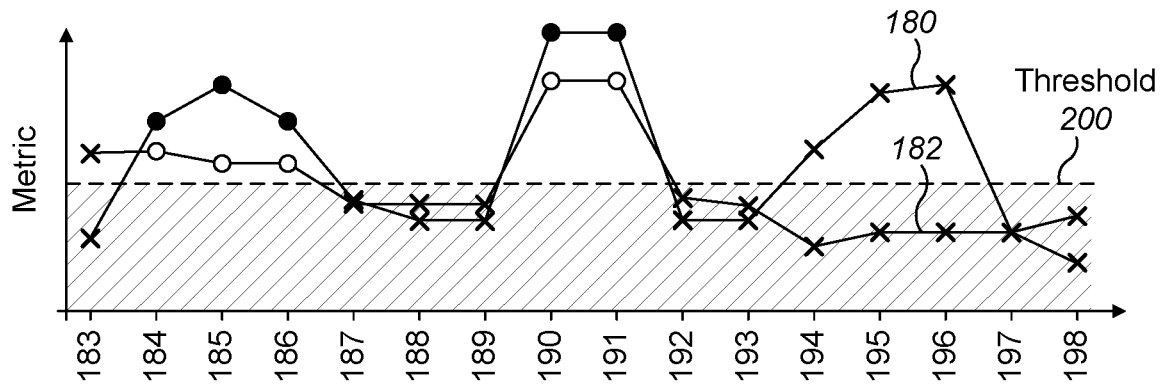
FIG. 11 illustrates a method of determining the active beam trajectory using a threshold.
Figure 12:
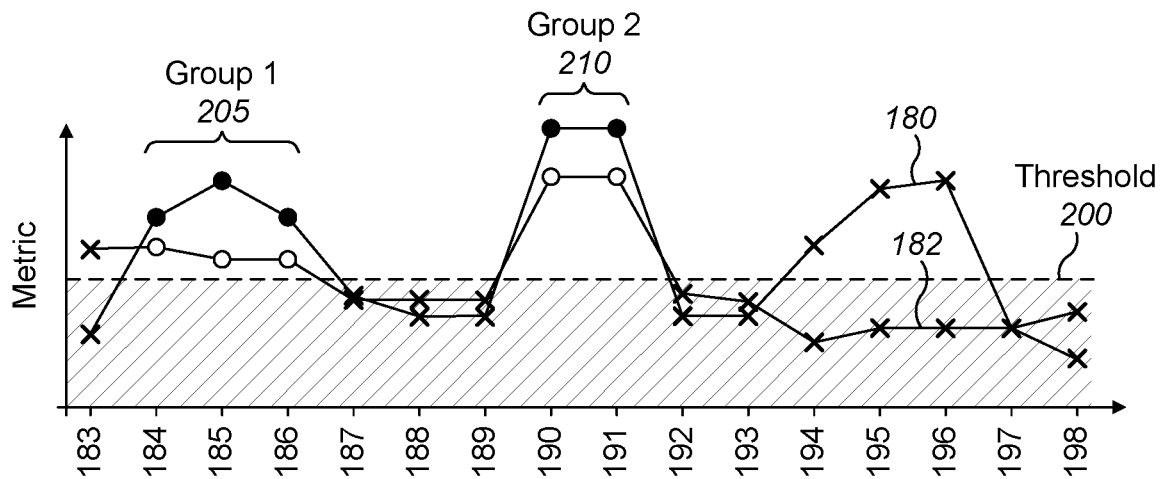
FIG. 12 illustrates a method of determining the active beam trajectory by grouping beam trajectories.

FIGS. 11 and 12 illustrate the process of selecting an active beam trajectory.

FIG. 11 shows the stability metric 180 and position accuracy metric 182 calculated as described above and plotted for each of 16 different proposed beam trajectories 183-198.

To select an active beam trajectory, a threshold 200 is applied and only proposed beam trajectories 184, 185, 186, 190 and 191 where both the stability metric 180 and the position accuracy metric 182 are above the threshold 200 are considered. The use of the threshold 200 enables proposed beam trajectories which do not meet a minimum standard to be excluded from further consideration.

As shown in FIG. 12, the remaining proposed trajectories 184, 185, 186, 190 and 191 that are above the threshold 200 are formed into two groups 205 and 210 of neighbouring beam trajectories. The group 205 contains proposed trajectories 184, 185 and 186. The group 210 contains proposed trajectories 190 and 191.

Although group 210 contains beam trajectories 190 and 191 which have the highest overall metric, the active beam trajectory is actually selected from group 205 because group 205 contains the greatest number of beam trajectories. Selecting the active beam trajectory from group 205 which contains the greatest number of beam trajectories improves stability of markerless tracking because there can be a greater level of relative movement between the oil rig 170 and the platform supply vessel 110 before this movement adversely affects the markerless tracking.

In this case, the active beam trajectory that is selected is proposed beam trajectory 185. As the proposed beam trajectory 185 is at the centre of the group 205. This allows for relative movement between the oil rig 170 and the platform supply vessel 110 in either direction. Alternatively, if movement was only expected to be in one direction, it may be desirable to choose proposed beam trajectories 184 or 186 (depending on the anticipated direction of movement).

In cases where the group contains two members, the active beam trajectory may be chosen to maximise the position accuracy metric.

If after grouping the beam trajectories, there is a choice between multiple groups, the group which maximises the position accuracy metric 182 may be preferred in order to provide the best possible markerless tracking accuracy.

FIGS. 5, 6, 7, 8 and 10 have illustrated calculating a metric for a beam trajectory by comparing images of pairs of regions which neighbour a given beam trajectory (for example, by comparing images of regions 142a and 142b in order to calculate a metric for beam trajectory 132a). This is advantageous because it is only necessary to store images of two regions, which reduces the amount of memory that the markerless tracking device 100 needs.

Figure 13:
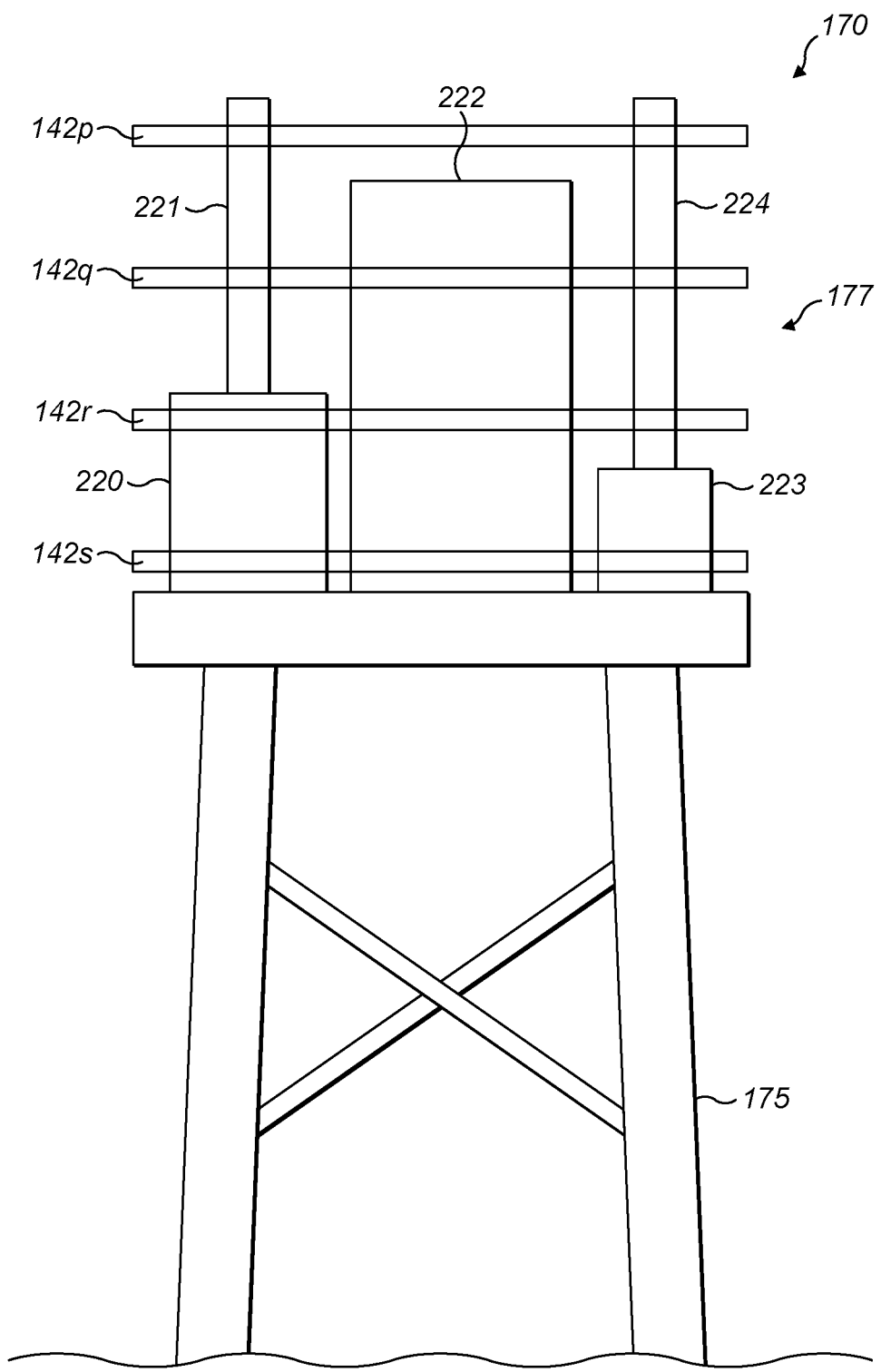
FIG. 13 illustrates calculating a metric for a beam trajectory based on a plurality of regions located across the superstructure of the oil rig.

FIG. 13 shows an alternative way to calculate a metric for a beam trajectory based on images of a plurality of regions, such as regions 142p-142s which are spread across the oil rig 170. An advantage of calculating a metric for a beam trajectory using images of a plurality of regions, such as regions 142p-142s, is that changes in the superstructure 177 which happen gradually over a series of regions can be detected.

In this example, when comparing regions 142p and 142q, features 221 and 224 remain constant, and the only difference between images of regions 142p and 142q is the appearance of feature 222 in the image of region 142q. Similarly, when comparing regions 142q and 142r, features 222 and 224 remain constant and the only change between the images of regions 142q and 142r is that the feature 221 in the image of region 142q is replaced with a slightly wider feature 220 in the image of region 142r. Finally, when comparing images of regions 142r and 142s, features 220 and 222 remain constant between the images of regions 142r and 142s, but the feature 224 in the image of region 142r is replaced by a wider feature 223 in the image of region 142s.

As only a small part of the superstructure 177 changes between each neighbouring pair of regions (that is, comparing regions 142p and 142q; regions 142q and 142r; and regions 142r and 142s), this can give a false impression that there is not much variation across the superstructure 177. Whereas, in fact, when comparing the image of region 142p with an image of region 142s, it can be seen that there has been a very significant change in the shape of the superstructure 177, which would make scan-matching images of regions 142p and 142s difficult or even impossible.

By comparing a plurality of regions (such as regions 142p-142s) when calculating a metric for a beam trajectory rather than just comparing neighbouring regions, the metric may be improved to account for long range variations in the superstructure 177, reducing the likelihood that it will be necessary to reselect the active beam trajectory during tracking.

By storing a plurality of images covering the entire superstructure 177 of the oil rig 170 before calculating the metric, the metric can be based on an estimate of the stability of wider regions of the scene. In this way, the active beam trajectory may be selected which represents the globally optimal beam trajectory, rather than merely being the locally optimal beam trajectory.

Although the invention has been described in terms of certain preferred embodiments, the skilled person will appreciate that various modifications could be made without departing from the scope of the claimed invention.

For example, although it has been described that the elevation angle is kept constant while the azimuthal angle in scanned, the elevation angle could be scanned instead while the azimuthal angle is kept constant (to illuminate a vertical region), or the elevation angle and the azimuthal angle could be changed simultaneously (to give a diagonal region).

Although the invention has been described in terms of the tracking device 100 being attached to, and controlling the position of, a platform supply vessel 110, the tracking device 100 could be used with any vessel, vehicle or aircraft.

Although the markerless tracking device 100 has been described as tracking an oil rig 170, the markerless tracking device 100 could be used to track any kind of moving or fixed object, such as another vessel, or a quayside.

What is claimed is:

1. A markerless tracking device comprising:
   a source configured to direct a beam on a plurality of beam paths, where each beam path illuminates a distinct region of an object;
   a sensor configured to receive beam reflected from each region and generate an image of each region; and
   a processor configured to:
   compare a plurality of neighboring pairs of the generated images for corresponding neighboring regions on the object;
   determine a beam trajectory for each of the plurality of neighboring pairs of images; and
   generate a metric for each beam trajectory which indicates suitability of that beam trajectory, wherein
   each metric is generated by comparing the images of the corresponding neighboring pair,
   the beam trajectory for each neighboring pair is configured to be aimed at a region positioned between the corresponding regions of that neighboring pair, and
   the beam trajectory for each neighboring pair is a path over which the beam is to be directed by the source during markerless tracking of the object.

2. The markerless tracking device of claim 1, wherein the metric for each neighboring pair is based on one or more of: a similarity between the images of the regions for that neighboring pair; and a positional accuracy achievable from the images of the regions for that neighboring pair.

3. The markerless tracking device of claim 1, wherein the processor is configured to compare the images of the regions for each neighboring pair by scan-matching the images of the regions for each neighboring pair, and the processor is configured to generate the metric for each neighboring pair based on the residual error of the scan-matching.

4. The markerless tracking device of claim 3, wherein the processor is configured to generate the metric for each neighboring pair based on a one of: residual disparity of the scan-matching; and covariance of the scan-matching.

5. The markerless tracking device of claim 1, wherein the processor is further configured to:
   select an active beam trajectory from the determined beam trajectories based on the generated metrics.

6. The markerless tracking device of claim 5, wherein the selected active beam trajectory has an associated metric which indicates that the active beam trajectory meets a required operational parameter for markerless tracking of the object.

7. The markerless tracking device of claim 5, wherein the processor is configured to select the active beam trajectory from beam trajectories of the determined beam trajectories having an associated metric that is above a threshold.

8. The markerless tracking device of claim 5, wherein the processor is configured to select the active beam trajectory by forming groups of neighboring beam trajectories of the determined beam trajectories that are above a grouping threshold.

9. The markerless tracking device of claim 8, wherein the processor is configured to select the active beam trajectory from a group comprising the greatest number of beam trajectories above the threshold.

10. The markerless tracking device of claim 9, wherein the processor is configured to select the active beam trajectory from a group with a number of beam trajectories which exceeds a group member threshold.

11. The markerless tracking device of claim 5, wherein the markerless tracking device is further configured to perform markerless tracking of the position and/or orientation of the object based on the active beam trajectory.

12. The markerless tracking device of claim 11, wherein the processor is configured to switch between a first mode in which the processor is configured to select an active beam trajectory of the object and a second mode comprising tracking of the object.

13. The markerless tracking device of claim 12, wherein the processor is configured to switch between the first and second modes when a residual error in scan-matching based on the active beam trajectory exceeds a threshold.

14. A method of markerless tracking of an object, the method comprising:
   directing a beam on a plurality of beam paths, where each beam path illuminates a distinct region of the object;
   generating an image of each region, wherein the image of each region is based on the beam reflected from the respective region;
   generating a first image of a first region;
   generating a second image of a second region;
   generating a metric which indicates suitability of a first beam trajectory, wherein
   the metric is generated by comparing the first and second image,
   the first beam trajectory is configured to be aimed at a third region positioned between the first region and the second region, and
   the first beam trajectory is a path over which the beam is to be directed during markerless tracking of the object; and
   comparing a plurality of neighboring pairs of the generated images to generate a metric for each neighboring pair of images, each metric indicating suitability of a corresponding beam trajectory configured to be aimed at a region positioned between the regions of the object for the neighboring pair used to generate that metric.

15. The method of claim 14, further comprising:
   storing the first image as a reference image;
   storing the second image as a current image; and
   comparing the current image against the reference image to generate the metric which indicates suitability of the first beam trajectory.

16. The method of claim 15, further comprising:
   storing the current image as a new reference image;
   generating a third image of a fourth region;
   storing the third image as a new current image; and
   comparing the new current image against the new reference image to generate the metric which indicates suitability of a second beam trajectory.

17. The method of claim 16, further comprising:
   selecting the active beam trajectory by forming groups of neighboring beam trajectories of the plurality of beam trajectories that are above a grouping threshold.

18. The method of claim 17, wherein the active beam trajectory is selected from a group comprising a greatest number of beam trajectories above the threshold.

19. A method of markerless tracking of an object, the method comprising:
   directing a beam on a plurality of beam paths, where each beam path illuminates a distinct region of the object;
   generating an image of each region, wherein the image of each region is based on the beam reflected from the respective region;

generating a plurality of neighboring pairs of images for corresponding neighboring regions on the object, each pair associated with a corresponding beam trajectory and each pair comprising a first image of a first region and a second image of a second region; and generating a metric for each beam trajectory which indicates suitability of that beam trajectory, wherein
- each metric is generated by comparing the first and second image of the corresponding neighboring pair,
- the beam trajectory for a given neighboring pair is configured to be aimed at a third region positioned between the first region and the second region of that neighboring pair, and
- the beam trajectory for each neighboring pair is a path over which the beam is to be directed during markerless tracking of the object.

* * * * *